(12) United States Patent
Boff

(10) Patent No.: US 11,124,120 B2
(45) Date of Patent: Sep. 21, 2021

(54) QUICK RELEASE MOUNTING SYSTEM AND METHODS OF USE

(71) Applicant: William J Boff, Fort Collins, CO (US)

(72) Inventor: William J Boff, Fort Collins, CO (US)

(*) Notice: Subject to any disclaimer, the term of this patent is extended or adjusted under 35 U.S.C. 154(b) by 362 days.

(21) Appl. No.: 16/059,774

(22) Filed: Aug. 9, 2018

(65) Prior Publication Data

US 2020/0047671 A1 Feb. 13, 2020

(51) Int. Cl.
*B60R 1/078* (2006.01)
*B62J 29/00* (2006.01)

(52) U.S. Cl.
CPC .............. *B60R 1/078* (2013.01); *B62J 29/00* (2013.01)

(58) Field of Classification Search
CPC .. B60R 1/078; B60R 9/10; B62J 29/00; B62J 1/28; B62J 17/04; B62J 11/00; B25B 17/02; B23B 31/263; B62K 21/125; B62K 25/02; B62K 21/16; B62K 15/006; B60B 27/026; F16B 39/32; F16B 2/14
USPC ........................................................ 359/842
See application file for complete search history.

(56) References Cited

U.S. PATENT DOCUMENTS

| 4,326,774 | A | | 4/1982 | Beigl |  |
|---|---|---|---|---|---|
| 4,605,289 | A | * | 8/1986 | Levine | G02B 7/1824 248/487 |
| 6,217,180 | B1 | | 4/2001 | Eisenbraum | |
| 6,905,234 | B2 | * | 6/2005 | Zagrodnik | B62J 6/05 362/474 |
| 6,910,781 | B2 | | 6/2005 | Spychalla | |
| 7,374,377 | B2 | * | 5/2008 | Bauman | B23B 31/008 408/239 R |
| 7,585,081 | B2 | | 9/2009 | Vanderslik | |
| 7,780,298 | B2 | * | 8/2010 | Greathouse | B60R 1/078 359/842 |
| 8,056,439 | B2 | * | 11/2011 | Fukui | B62L 3/02 74/502.2 |
| 8,757,460 | B1 | * | 6/2014 | Barnes | B62J 11/00 224/413 |
| 9,180,925 | B2 | * | 11/2015 | Carnevali | B60R 1/06 |
| 2001/0043841 | A1 | * | 11/2001 | Wienhold | B25B 23/0035 408/240 |
| 2004/0135054 | A1 | * | 7/2004 | De Leon | B60R 1/078 248/475.1 |
| 2005/0237643 | A1 | * | 10/2005 | Wu | B60R 1/06 359/871 |

(Continued)

FOREIGN PATENT DOCUMENTS

WO WO2007032636 A1 3/2007

*Primary Examiner* — Stephone B Allen
*Assistant Examiner* — Rahman Abdur
(74) *Attorney, Agent, or Firm* — Leyendecker & Lemire, LLC

(57) ABSTRACT

A quick release mounting system for motorcycle mirrors and similar devices that may be attached directly or indirectly to a handlebar of a motorcycle or similar type vehicle is described. The system comprises as an assembly a first part that is attached to or unitarily formed as part of the stem of a motorcycle mirror. A second part is attached to the motorcycle, typically proximate the handlebar. By releasing a locking mechanism the first part can be separated from the second part to allow the mirror to be removed from the motorcycle. The first and second parts typically comprise a non-circular shank and a non circular bore in which the shank is lockably received.

17 Claims, 6 Drawing Sheets

(56) References Cited

U.S. PATENT DOCUMENTS

2011/0024598 A1\* 2/2011 Carnevali ................ B60R 1/06
                                                        248/482
2011/0141595 A1   6/2011 Carnevali
2019/0135365 A1\* 5/2019 Jesse ....................... B62J 11/24

\* cited by examiner

QUICK RELEASE MOUNTING SYSTEM AND METHODS OF USE

BACKGROUND

Owners of motorcycles are known to customize and accessorize their rides. One of the most common upgrades includes the replacement of stock left and right handlebar-mounted mirrors. Motorcycle mirrors are most often attached to the motorcycle by way of a threaded stud on the attachment end of the mirror's stem. The stud screws into a threaded bore typically located on a handlebar clamp or the brake and clutch lever handlebar mounts.

Removing the mirror can be quite easy and as simple as grabbing the mirror or the stem and rotating the assembly counterclockwise until the stud is unthreaded. Some higher end mirrors can be quite pricey making them attractive candidates for theft. Additionally, mirrors are easily breakable in the case of a crash or bike drop and riders therefore often desire to remove them when transitioning from street to off-road riding. Of course, the owner could remove the mirrors each time he/she leaves the bike unattended in a public place or transitions to off-road riding, but the unthreading and rethreading of the mirror can be a hassle. Each time the mirror assembly is reinstalled, the position of the stem would have to be adjusted each time to ensure the mirror is properly positioned for use, and this requires two wrenches. Further, because the threaded bores are typically aluminum and the studs are steel, the repeated threading and unthreading runs the very real risk that over time, the aluminum threads will become damaged requiring the replacement of an expensive component, such as the brake lever mount.

DETAILED DESCRIPTION

Figure 1:
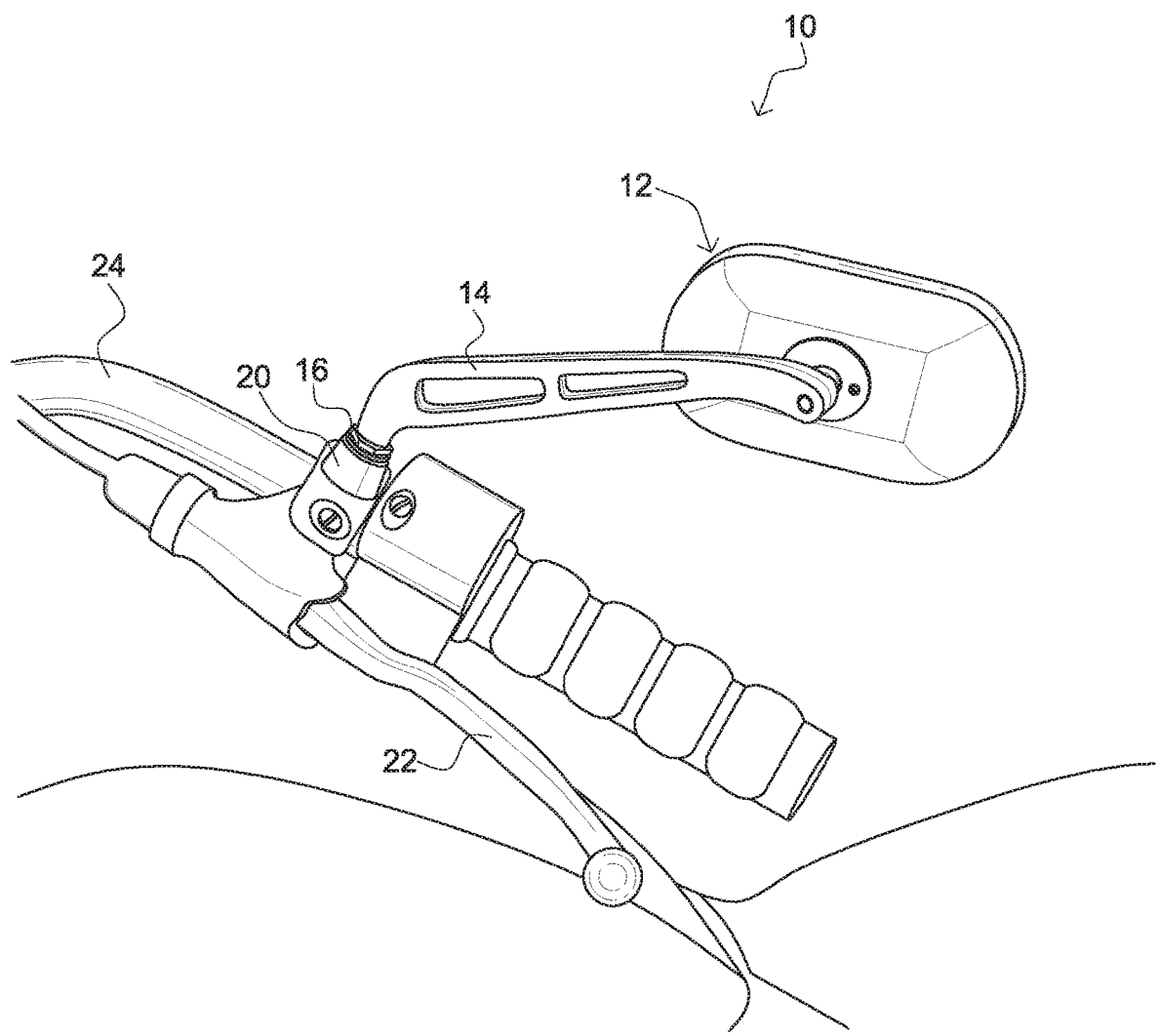
FIG. 1 is a prior art illustration of a motorcycle mirror mounted to a motorcycle handlebar by way of the clutch lever mount.

One embodiment the invention comprises a quick release mounting system for motorcycle mirrors and similar devices that may be attached directly or indirectly to a handlebar of a motorcycle or similar type vehicle. Other embodiments comprise the combination of the mounting system in conjunction with the item being mounted, such as a mirror assembly. Yet other embodiments pertain to the methods of using the foregoing mounting system and associated combinations.

The embodiment primarily described and discussed pertains to a quick release mount used with motorcycle mirror assembly to allow the assembly to be quickly removed from a motorcycle by hand as desired to eliminate the risk of the mirror assembly being stolen when the bike is left unattended for a period of time or damaged in off-road riding. As can be appreciated, the mount can be used for a variety of different functions on a motorcycle or similar type vehicle as is also described herein. Accordingly, it is to be appreciated that many of the elements, limitations and features described herein concerning the quick release mount for a mirror assembly also apply, as applicable, to other uses and configurations.

The configuration of an embodiment of the quick release mount permits the rapid removal and reattachment without tools of a mirror assembly in the proper and preset aligned position. The embodiment includes at least a first part having a non-circular bore and a second part including corresponding and mating non-circular shaft. When the shaft is received in the bore, the shaft will not rotate axially relative to the bore and is fixed in place.

Inside the bore typically protruding from the bore's inside surface are one or more retractable protrusions. The protrusions, which in some variations comprise ball bearings, are typically biased into a slot or notch in the non-circular shaft. When the protrusion is received in the slot, the shaft is effectively locked in place. By relieving the biasing, the protrusion can be retracted as the shaft is slid out of the bore. Often the protrusion is retracted or relieved of the biasing force by sliding a sprung collar axially. The quick release mechanism is similar to mechanisms used in quick release chucks for drills and other hand held power tools.

In one embodiment the first part of the quick release mechanism is part of or otherwise secured to the end of the mirror assembly's shaft and the second part is secured to the mounting location on the motorcycle, typically the brake or clutch lever mount. Most often the second part will include a threaded stud with a lock nut that is threadably received into the threaded bore of the mounting location and locked in place by tightening the lock nut. Once this is done the mirror can be removed and replaced by separating the first and second parts while maintaining the general orientation of the mirror relative to the bike and its handlebar.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

An Embodiment of a Handlebar Mounting System

Embodiments of the present invention comprise a quick release assembly designed for use with a typical handlebar mounted mirror assembly. FIG. 1 illustrates a typical motorcycle mirror assembly mounted to a handlebar 24 by way of a clutch lever assembly 22. The prior art mirror assembly 10 typically comprises a mirror 12 which is pivotally mounted to an elongated stem 14 on a first end. A second end of the stem most often includes a threaded stud (not seen) that is threadably received into a complimentarily threaded mounting bore 20 (also referred to as a "clamp threaded bore" herein) in the clutch lever assembly (or brake lever assembly on the right side of the handlebar). To help fix the stem and mirror in place, a lock nut 16 may also be provided.

Figure 2:
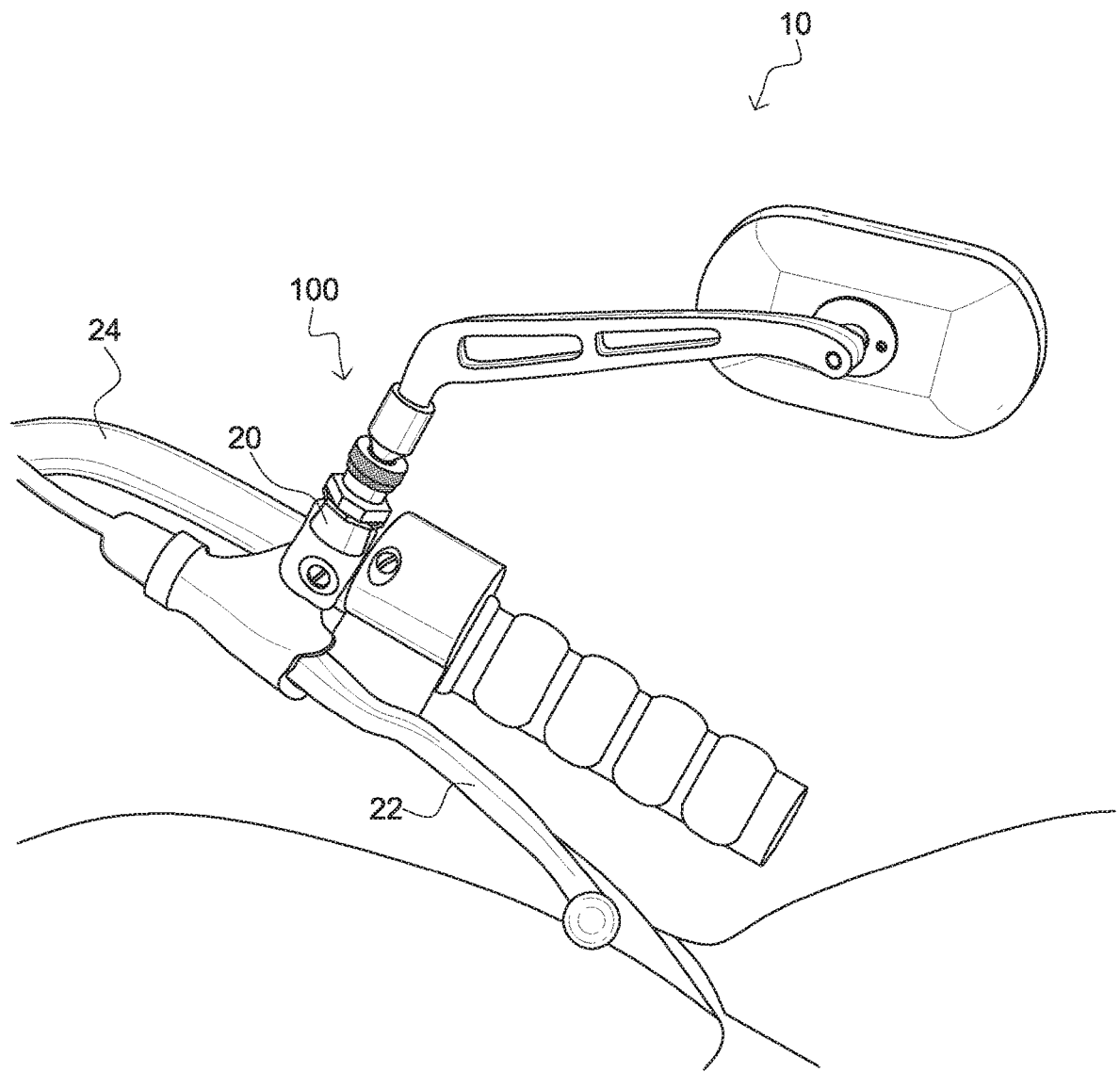
FIG. 2 is a perspective view of a motorcycle handlebar with a motorcycle mirror mounted to the clutch lever mount with a quick release assembly according to one embodiment of the present invention.

A motorcycle mirror assembly incorporating the quick release assembly 100 as attached to a motorcycle is illustrated in FIG. 2. The mirror assembly 10 is substantially similar to the assembly shown in FIG. 1 as is the motorcycle handlebar 24 and clutch lever assembly 22; however, in between the threaded stud 18 (not seen) and the mounting bore 20, the quick release assembly 100 has been added to permit a rider to quickly and easily remove and reattach the mirror assembly without the use of tools.

Figure 3:
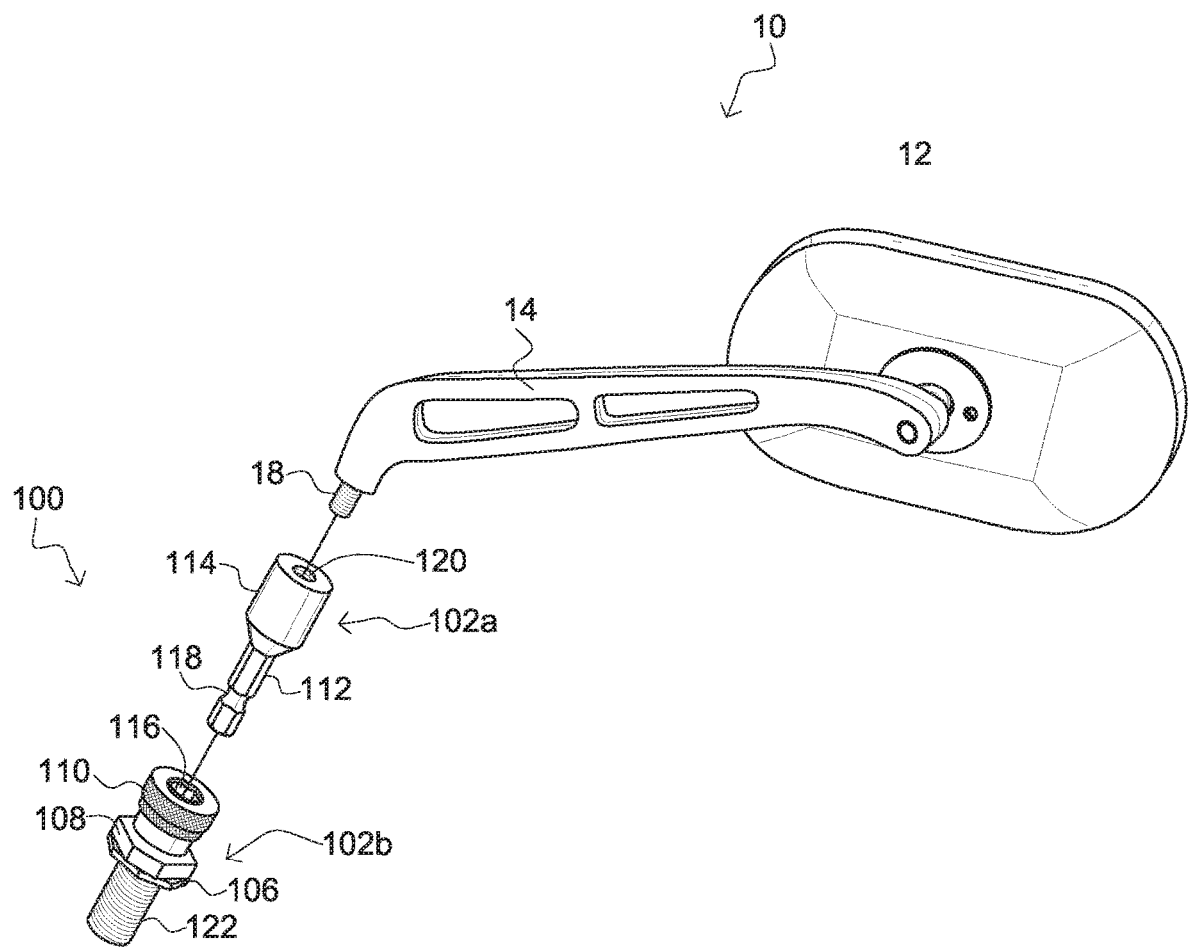
FIG. 3 is a perspective exploded view of a typical motorcycle mirror in combination with the interconnecting first and second parts of a quick release assembly according to one embodiment of the present invention.

With reference to FIG. 3, the embodiment of the quick release assembly 100 primarily comprises an upper first part 102a that attaches to the stud 18 of the motorcycle mirror assembly, and a lower second part 102b that attaches to the mounting bore 20 of the clutch lever assembly 22.

As shown the first part 102a comprises a threaded mirror-receiving bore 120 on a top end portion 114 that receives the threaded stud 18 therein. A non-circular shank 112 extends downwardly from the body of the mirror-receiving bore. The shank as shown is hexagonal but in other embodiments and variations, the shank can be of any cross sectional configuration that prevents the shank from turning about its axis when received in the quick release locking bore 116. A slot 118 is provided that typically extends circumferentially around the shank often proximate the shank's bottom end. The slot interacts with the locking mechanism in the second part to secure the first part and the mirror assembly 10 in place.

The second part comprises a body defining the quick release locking bore 116 that has a complementary non-circular shape with the non-circular, or hexagonal as shown, shank 112. Extending down from the bore body is a threaded mounting stud 122 sized for receipt into the clutch lever mounting bore 20. Hexagonal wrench flats 108 are also provided on the body of the second part to allow the user to tighten the second part in place on the motorcycle. A locknut 106 can also be provided to help tightly secure the second part in place. As can be appreciated on some clutch or brake levers, an unthreaded mounting hole extends through each lever and is secured in place by nuts located above and below the lever on a threaded mounting stud. A upwardly biased cylindrical member 110 is also shown. In its normal position the first part when received in the locking bore is locked in place and cannot be rotated or removed from the second part. By moving the cylindrical member downwardly, an internal locking mechanism is released allowing the separation of the first and second parts.

Figure 6:
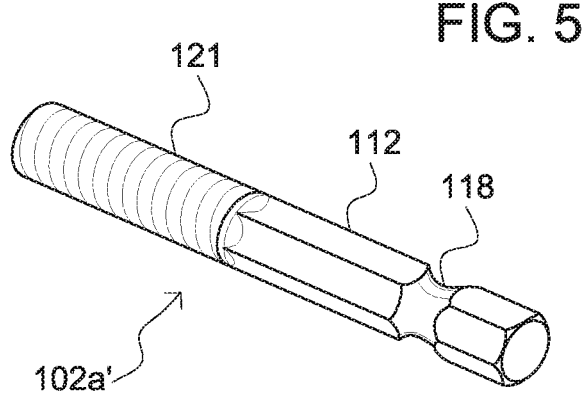
FIG. 6 is a perspective view of a first part of the quick release assembly comprising a shaft comprising one end having a hexagonal shape and the opposite end being threaded according to one embodiment of the present invention.
Figure 7A:
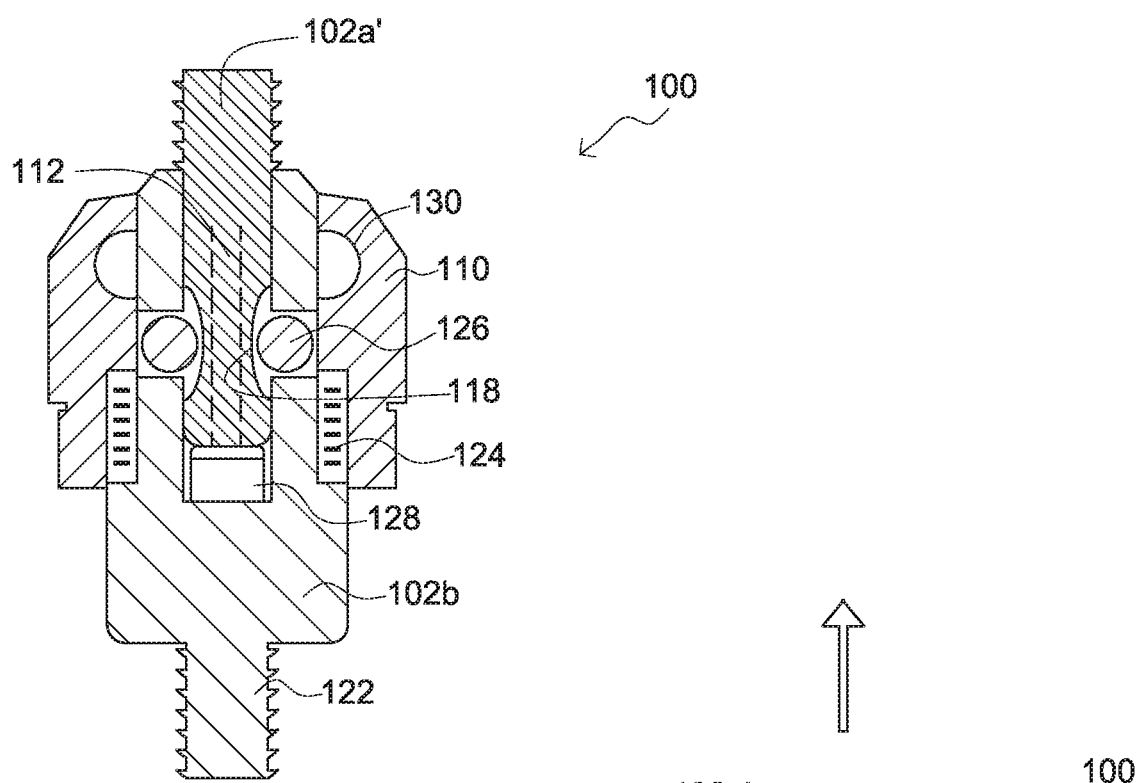
FIGS. 7A&B are cross sectional views of the quick release assembly in locked and release positions respectively according to one embodiment of the present invention.
Figure 7B:
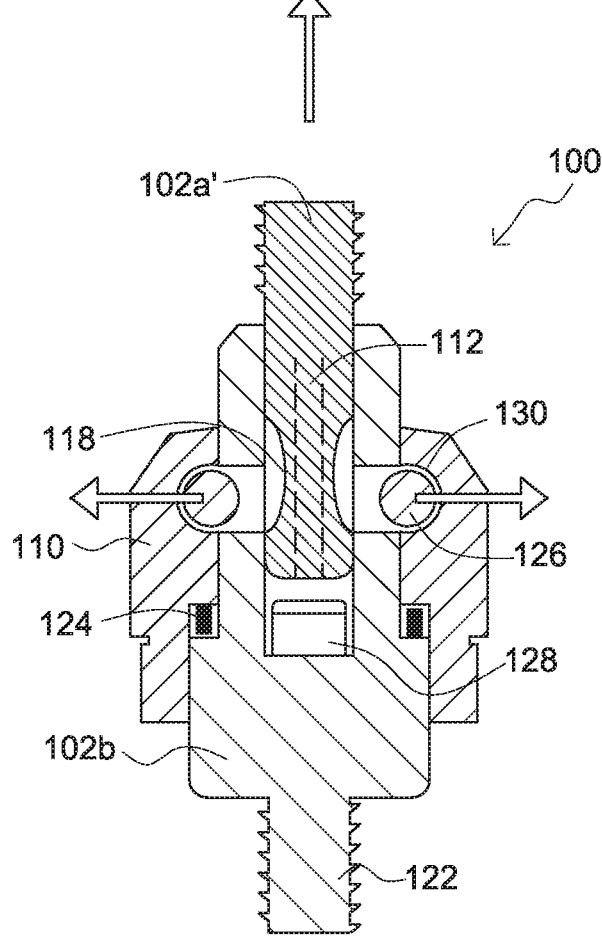

FIGS. 7a&b are cross sections of the quick release assembly 100. In FIG. 7a, the quick release assembly is shown in the locked position wherein the first part 102a' is secured in the second part 102b. Of important note, the illustrated first part is the version also shown in FIG. 6 having a threaded stud 121 instead of a threaded bore 120. This other first part is described in more detail below. In FIG. 7b, the cylindrical sleeve 110 has been moved downwardly showing the quick released assembly in its release or unlocked position. As can be appreciated the specific configuration of the quick release mechanism and the specific manner in which it operates can vary in other embodiments and variations. Quick release mechanisms are well known wherein a user can quickly and without the use of extraneous tools easily unlock two connected pieces. Any suitable quick release mechanism can be used in embodiments of the present invention.

As shown the locking mechanism of the second part 102b comprises the cylindrical sleeve biased in an upwardly position by a spring 124 that holds a pair of ball bearings 126 partially in the slot 118 of the hexagonal shank 112 of the first part 102a. A bumper 128 can be provided at the base of the locking bore 116 to support the end of the first part and stabilize the mirror assembly when connected to the motorcycle. The optional bumper can be made of any suitable material but in some embodiments comprises an elastomeric polymer.

An outwardly-extending circumferential groove 130 is also provided on the inside surface of the cylindrical sleeve 110 sized and configured to receive a portion of the ball bearings therein when the sleeve is moved downwardly to align the groove with the ball bearings and the associated circular openings 134 in the second part's body 132 in which the bearings are received. When a portion of the ball bearings are received in the outwardly extending circumferential groove as a user is both pulling the sleeve downwardly and urging the mirror assembly and the first part 102a' upwardly, they are urged out of both the circumferential slot 118 in the shank 112 of the first part and the locking bore 116. The foregoing unlocks the quick release and permits the mirror assembly except for the second part 102b to be removed from the motorcycle.

To reinstall the mirror, the user inserts the first part into the bore of the second part while holding the cylindrical sleeve down. Once the shank 112 is seated the user can release the sleeve and the portions of the ball bearings 126 are encouraged into the circumferential sleeve 118 of the shank to lock the first part and the mirror assembly in place.

Figure 4:
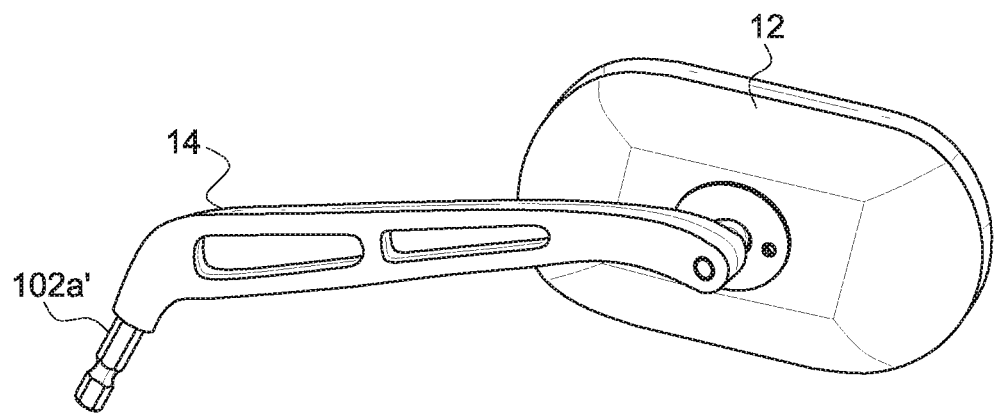
FIG. 4 is a perspective view of a motorcycle mirror having a hexagonal shank mounted to the end of the stem in place of the threaded stud that is traditionally provided according to one embodiment of the present invention.
Figure 5:
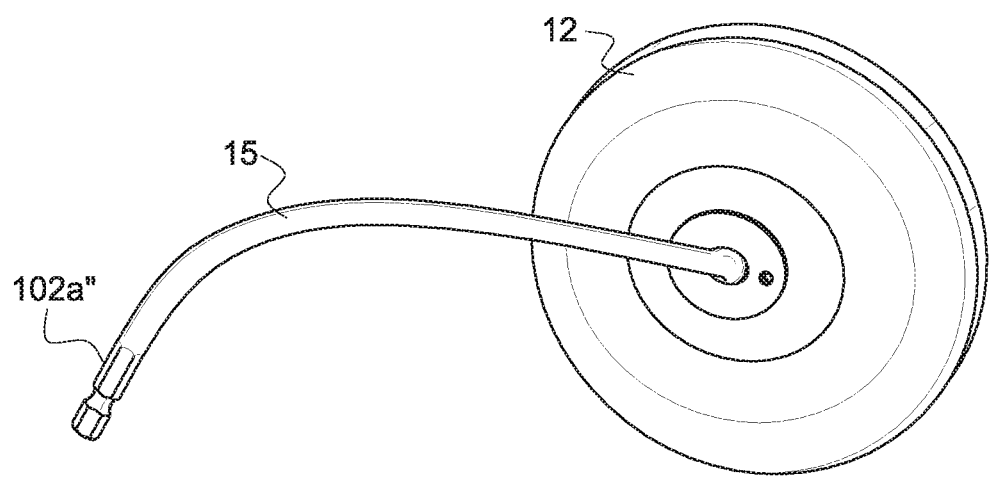
FIG. 5 is a perspective view of a motorcycle mirror having a hexagonal shank unitarily formed into the end of the stem according to one embodiment of the present invention.

FIGS. 4-6 illustrate variations of the mirror assembly 10 and quick release first part 102a. With reference to FIGS. 1 & 3, many motorcycle mirror assemblies comprise stems 14 that have a threaded stud 18 secured in the distal or mounting end of the stem. The typical threaded stud in a prior art configuration is threaded into both the stem and then into the mounting bore 20 of the clutch or brake lever assembly. This type of mirror assembly 10 is illustrated in FIG. 3 wherein a quick release first part 102a is utilized that has a mirror-receiving bore 120 to receive the lower portion of the threaded stud therein.

FIG. 6 shows a variation of the quick release first part 102a' that allows the first part to be directly threaded into the end of the mirror's stem 14 eliminating the threaded stud 18 as shown in FIG. 3. This first part is shown directly attached to the stem in FIG. 4. The alternative first part includes the non-circular shank 112 with the circumferential slot 118 as in the first part 102a of FIG. 3 except the mirror-receiving bore 120 is replaced with a threaded extended portion 121 of the shank.

Some motorcycle mirror assemblies are known wherein the stem is typically comprised of a rod of steel and the end of the stem itself is threaded. FIG. 5 illustrates a mirror assembly wherein a hexagonal shank 112 and associated circumferential slot 118 are formed on the end of the rod to create a first part 102a'' that is unitary with the stem 15. It is to be appreciated that other variations of the parts of the quick release assembly are contemplated allowing for the integration of the quick release with known mirror assemblies as well as provide mirror assemblies specifically designed and configured to work with embodiments of the quick release assembly.

Implements for Use with the Mounting System

The quick release assembly has been described herein primarily in relation to use with a motorcycle mirror mounted directly or indirectly to the handlebar of a motorcycle. As can be appreciated, the quick release mounting system can be used in conjunction with other implements and devices on a motorcycle and other types of vehicles that a user may want to be able to remove and replace quickly. Two examples are provided herein although numerous other applications are contemplated.

Figure 8:
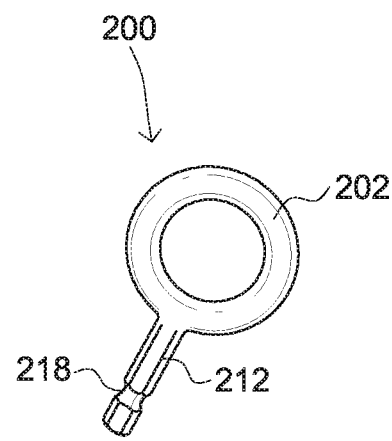
FIG. 8 is a perspective view of a first part of a quick release assembly that provides a tie down loop according to one embodiment of the present invention.

FIG. 8 comprises a tie down loop 200 comprising a metal loop 202 through which a strap or cord can be threaded or a hook can be secured. extending from the loop is a non-circular shank 212 of the type described above. The shank, which as illustrated is hexagonal, also includes a circumferential slot 218. The shank is received in a quick release second part 102b of the type shown in FIG. 3. As can be appreciated, the threaded mounting stud 122 of the second part can be replaced with any suitable mount to secure the second part on the desired part of the motorcycle or other vehicle.

Figure 9:
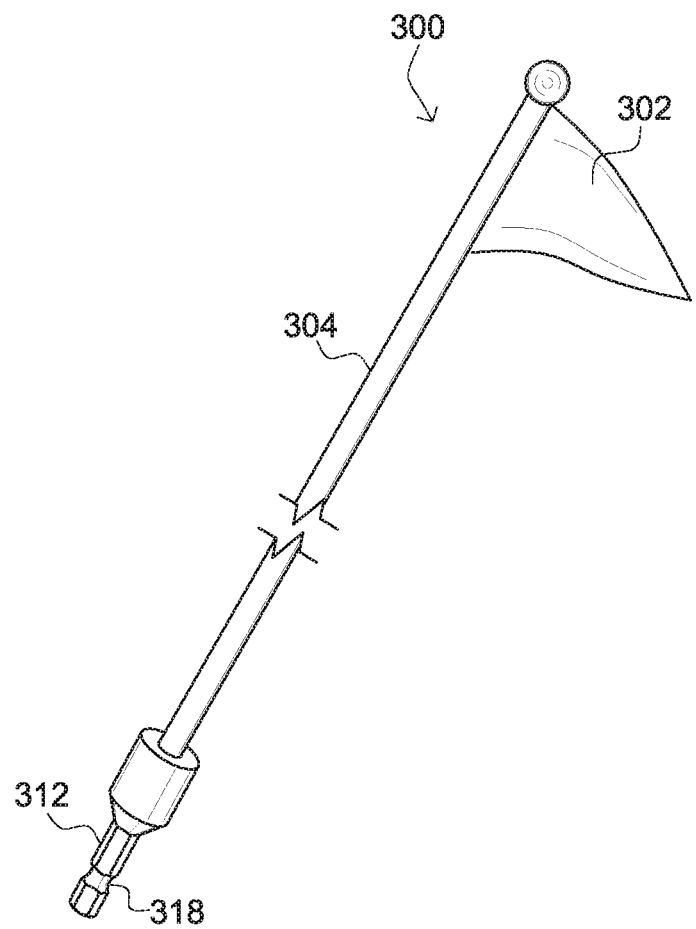
FIG. 9 is a perspective view of a first part of a quick release assembly attached to the end of a safety flag (not to scale) according to one embodiment of the present invention.

FIG. 9 comprises a safety flag assembly 300 that comprises a flag 302, a flag shaft or pole 304 and a non-circular shank 312 of the type described above. Like the shank for the tie down loop 200, this shank is hexagonal and also includes a circumferential slot 318. Likewise, the shank can also be received in a quick release second part 102b of the type shown in FIG. 3. Also, as with the quick release second part mentioned above, any suitable mounting structure can be substituted for the threaded stud 122.

Other Variations and Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A quick release mirror assembly for a motorcycle, the assembly including:
   a mirror;
   an elongated stem with first and second stem ends, the first stem end being attached to the mirror, the second stem end comprising one of a threaded stem stud and a threaded stem recess; and
   a quick release mechanism having connectable and separable first and second quick release parts,
      the first quick release part comprising distal and proximal first part ends, the proximal first part end being a shank having a non-circular shank cross section, the distal first part end being one of a first part threaded stud and a first part threaded recess, the distal first part end being threadably attached to the second stem end, and
      the second quick release part comprising (i) a bore having a non-circular bore cross section, (ii) a locking mechanism configured to secure the first quick release part and (iii) a second part threaded stud, the second part threaded stud being generally axially aligned with the bore;
   wherein the shank is configured for secure and non-rotatable receipt into the bore to be releasably secured by the locking mechanism, and the second part threaded stud is configured to be received in a mount on the motorcycle.

2. The quick release mirror of claim 1, wherein (i) the shank includes a circumferential slot extending around the shank generally proximate a shank bottom end thereof, (ii) the second quick release part includes (a) at least one protrusion extending from an inside surface of the bore and (b) a cylindrical sleeve moveable between a first position and a second position with the protrusion being retracted when the cylindrical sleeve is moved into the second position.

3. The quick release mirror of claim 2, wherein the cylindrical sleeve is biased in the first position.

4. The quick release mirror of claim 2, wherein the at least one protrusion comprises a ball bearing.

5. The quick release mirror assembly of claim 1, wherein the non-circular shank and bore cross sections are hexagonal.

6. In combination, the quick release mirror assembly of claim 1 and the motorcycle wherein the mirror assembly is attached to the motorcycle proximate a handlebar of the motorcycle.

7. The combination of claim 6, wherein the motorcycle includes one or both of a clutch lever assembly and a brake lever assembly with each assembly being attached to the handlebar of the motorcycle by way of a clamp, each assembly further including a clamp threaded bore, the clamp threaded bore having the second part threaded stud threadably received therein.

8. A method of using the combination of claim 6, the method comprising:
   riding the motorcycle;
   parking the motorcycle; and
   removing the mirror assembly from the motorcycle except for the second part by releasing the locking mechanism and pulling the first quick release part out of the second quick release part.

9. In combination, two quick release mirror assemblies of claim 1 and the motorcycle wherein each mirror assembly is attached to the motorcycle proximate a handlebar of the motorcycle.

10. A quick release assembly for attaching a releasably securing a motorcycle mirror to a motorcycle, the quick release assembly comprising:
   a first quick release part including a shank having a non-circular shank cross section proximate a proximal first part end, and one of a threaded bore or threaded shank portion at a distal first part end, the distal first part end being opposite and aligned with the proximal first part end;
   the second part comprising (i) a receiving bore having a non-circular bore cross section, (ii) a locking mechanism configured to secure the first quick release part and (iii) a threaded stud, the threaded stud being aligned with and opposite the bore;
   wherein the shank is configured for secure and non-rotatable receipt into the receiving bore to be releasably secured by the locking mechanism.

11. The quick release assembly of claim 10, having the threaded shank portion at the first part distal end, and wherein the threaded shank portion is sized to be received in a threaded stem bore of a motorcycle mirror.

12. The quick release assembly of claim 10, having the threaded bore at the first part distal end, and wherein the threaded bore is sized to receive a threaded end of a stem of a motorcycle mirror.

13. The quick release assembly of claim 10, wherein the threaded stud is configured for receipt into a threaded bore on one of a motorcycle clutch lever assembly, a motorcycle brake lever assembly and a handlebar clamp.

14. The quick release assembly of claim 10, wherein (i) the shank includes a circumferential slot extending around the shank generally proximate a bottom end thereof, (ii) the second part includes (a) at least one protrusion extending from an inside surface of the receiving bore and (b) a cylindrical sleeve moveable between a first position and a second position with the protrusion being retracted when the sleeve is moved into the second position.

15. The quick release assembly of claim 14, wherein the cylindrical sleeve is biased in the first position.

16. The quick release assembly of claim 15, wherein the non-circular cross sections of the shank and receiving bore are hexagonal.

17. The quick release assembly of claim 16, wherein the at least one protrusion comprises a ball bearing.

* * * * *